US010963798B2

(12) United States Patent
Rao et al.

(10) Patent No.: US 10,963,798 B2
(45) Date of Patent: Mar. 30, 2021

(54) MULTIMEDIA CONTENT DISTRIBUTION AND RECOMMENDATION SYSTEM

(71) Applicant: ACCENTURE GLOBAL SOLUTIONS LIMITED, Dublin (IE)

(72) Inventors: Srikanth G Rao, Bangalore (IN); Ranjana Bhalchandra Narawane, Mumbai (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 897 days.

(21) Appl. No.: 15/458,726

(22) Filed: Mar. 14, 2017

(65) Prior Publication Data

US 2018/0218271 A1  Aug. 2, 2018

(30) Foreign Application Priority Data

Jan. 31, 2017 (IN) .............................. 201741003484

(51) Int. Cl.
*G06N 5/04* (2006.01)
*H04L 29/08* (2006.01)
*G06F 16/48* (2019.01)

(52) U.S. Cl.
CPC ............... *G06N 5/04* (2013.01); *G06F 16/48* (2019.01); *H04L 67/1097* (2013.01); *H04L 67/22* (2013.01); *H04L 67/325* (2013.01)

(58) Field of Classification Search
CPC ....... G06N 5/04; G06F 16/48; H04L 67/1097; H04L 67/22; H04L 67/325
See application file for complete search history.

(56) References Cited

U.S. PATENT DOCUMENTS

| 8,037,506 | B2 | 10/2011 | Cooper et al. |
| 8,063,295 | B2 | 11/2011 | Bonet et al. |
| 8,209,277 | B2 | 6/2012 | Kumar et al. |
| 8,484,244 | B2 | 7/2013 | Gillet et al. |
| 8,666,909 | B2 | 3/2014 | Pinckney et al. |
| 8,909,771 | B2 | 12/2014 | Heath |

(Continued)

FOREIGN PATENT DOCUMENTS

| WO | 2002057848 A2 | 7/2002 |
| WO | 2002095600 A1 | 11/2002 |
| WO | 2012116078 A1 | 8/2012 |

OTHER PUBLICATIONS

Gevaria et al., "Movie Attendance Prediction," in 130.3 Int'l J. Computer Applications 14-17 (2015). (Year: 2015).*

(Continued)

*Primary Examiner* — Kamran Afshar
*Assistant Examiner* — Ryan C Vaughn
(74) *Attorney, Agent, or Firm* — Mannava & Kang, P.C.

(57) ABSTRACT

A multimedia content distribution system can receive and store multimedia content items from content providers. The system may also receive and store content distribution information from a variety of different data sources that is related to the multimedia content items and the distribution of the multimedia content items. The system may predict viewership for a multimedia content item for future release dates based on the content distribution information, and provide automated control of the distribution of the multimedia content item, which may include distribution over a content distribution network.

20 Claims, 4 Drawing Sheets

(56) References Cited

U.S. PATENT DOCUMENTS

| | | | |
|---|---|---|---|
| 2004/0158865 A1 | 8/2004 | Kubler et al. | |
| 2004/0181819 A1* | 9/2004 | Theiste | H04N 7/17336 725/146 |
| 2006/0190369 A1 | 8/2006 | Ryles et al. | |
| 2015/0051949 A1* | 2/2015 | Pickton | G06Q 30/0202 705/7.31 |
| 2018/0124444 A1* | 5/2018 | van Zwol | H04N 21/4668 |

OTHER PUBLICATIONS

Rentrak, "Rentrak and Gower Street Analytics Partner to Build New Products for Global Movie Market", Oct. 18, 2015, 3 pages.

"Gower Street Analytics", Oct. 15, 2016, 4 pages. <https://web.archive.org/web/20161015222326/https://www.gowerst/>.

"Big Data and Hollywood: a Love Story", IBM- the Atlantic Sponsor Content, Oct. 15, 2016, 6 pages. <https://web.archive.org/web/20161015015703/http://www.theatlantic.com/sponsored/ibm-transformation-of-business/ big-data-and-hollywood-a-love-story/277/>.

Prasant Naidu, US & World News, "IBM Brings Analytics to Bollywood for Predicting Success of Movies", Mar. 18, 2014, 3 pages.

Capgemini, "Digital Entertainment Exchange", 2017, 8 pages.

Einav et al., "Seasonality and Competition in Time: An Empirical Analysis of Release Date Decisions in the U.S. Motion Picture Industry", Aug. 12, 2002, 56 pages.

Sharda et al., "Predicting box-office success of motion pictures with neural networks", Expert Systems with Applications, 30 (2006) pp. 243-254.

Greg Gilman, "AMC Theatres to Market Movies to Audiences Based on Analytics of Individual Interest", May 5, 2015, 2015, 5 pages.

Zhang et al., "Forecasting box office revenue of movies with BP neural network", Elsevier, Expert Systems with Applications 36, (2009), pp. 6580-6587.

\* cited by examiner

MULTIMEDIA CONTENT DISTRIBUTION AND RECOMMENDATION SYSTEM

PRIORITY

The present application claims priority under 35 U.S.C. 119(a)-(d) to Indian patent application number 201741003484, having a filing date of Jan. 31, 2017, the disclosure of which is hereby incorporated by reference in its entirety.

BACKGROUND

There are many types of video distribution systems, including interactive video distribution systems. These video distribution systems may include point-to-multipoint system configurations, which are used for the unidirectional distribution or delivery of motion video data resulting from interactions between systems operators, such as service providers, and users. These systems may include dedicated communications systems which primarily distribute or deliver motion video data in the manner indicated, but which may, in addition, provide a framework for further, diverse data communications or services in either unidirectional or bidirectional form.

BRIEF DESCRIPTION OF DRAWINGS

Embodiments and examples are described in detail in the following description with reference to the following figures. The embodiments are illustrated by examples shown in the accompanying figures in which like reference numerals indicate similar elements.

DETAILED DESCRIPTION

For simplicity and illustrative purposes, the principles of the present disclosure are described by referring mainly to examples and embodiments. In the following description, numerous specific details are set forth in order to provide an understanding of the examples and embodiments. It will be apparent, however, to one of ordinary skill in the art, that the examples and embodiments may be practiced without limitation to these specific details. In some instances, well known methods and/or structures have not been described in detail so as not to unnecessarily obscure the descriptions of the examples and embodiments. Furthermore, the examples and embodiments may be used together in various combinations.

According to an embodiment of the present disclosure, a multimedia content distribution system can receive and store multimedia content items from content providers. The system may also receive and store content distribution information from a variety of different data sources that is related to the multimedia content items and the distribution of the multimedia content items. The system may predict viewership for a multimedia content item for future release dates based on the content distribution information, and provide automated control of the distribution of the multimedia content item, which may include distribution over a content distribution network. The multimedia content items may include digital motion pictures, such as movies, or other types of digital multimedia content items. A multimedia content item may include content that includes video or any combination of different content forms such as text, audio, images, video and interactive content.

A technical problem associated with existing video distribution systems is the inability to control automated distribution of video based on different parameters which may be specific to each video content item. The multimedia content distribution system, according to an embodiment of the present disclosure, can determine an optimized release date and an optimized set of destination devices and viewing screens for a motion picture or another type of multimedia content item based on a variety of different parameters discerned from a plurality of data sources, and automate the distribution of the multimedia content item to the selected set of destination devices and viewing screens.

Figure 1:
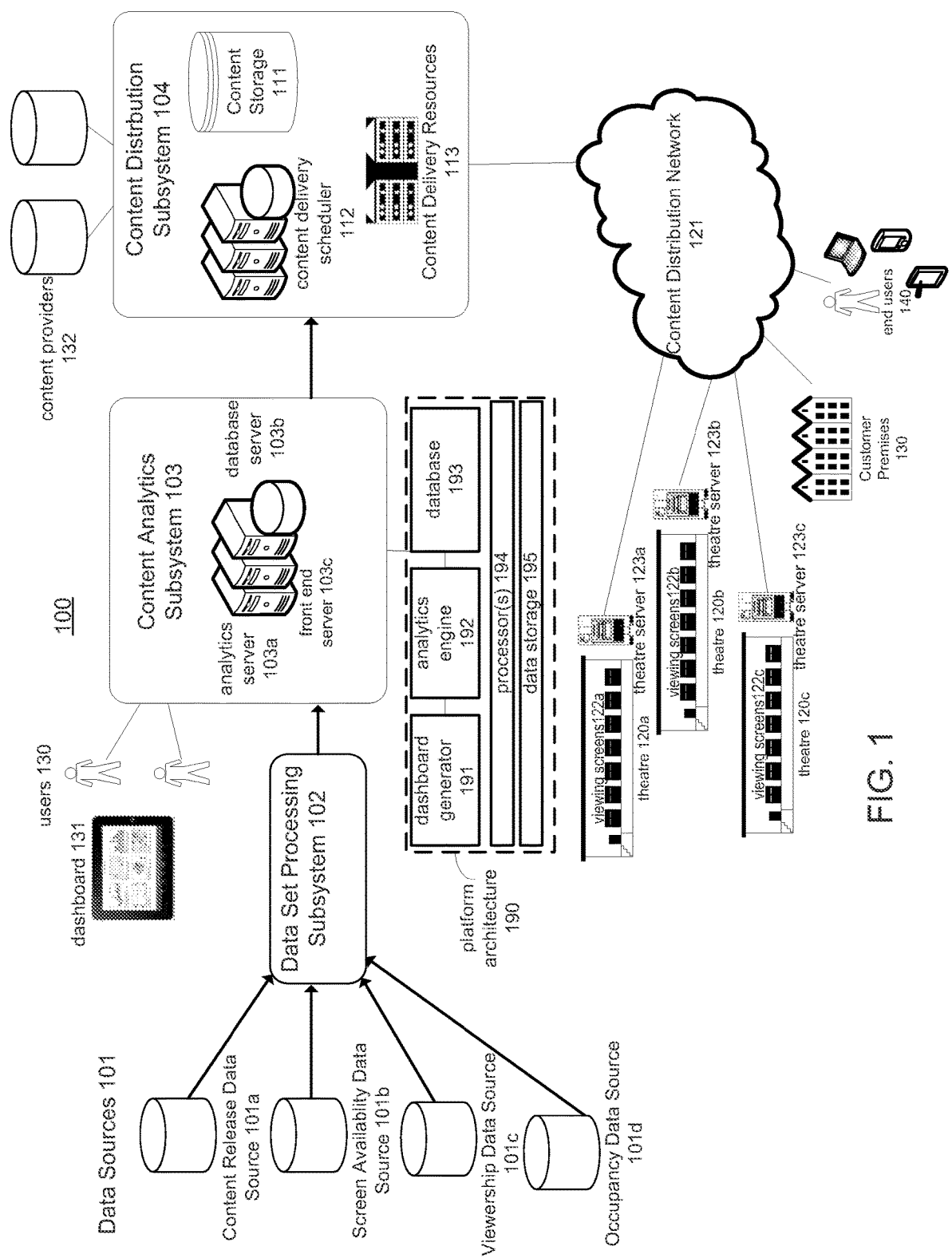
FIG. 1 illustrates a multimedia content distribution system, according to an embodiment.

FIG. 1 illustrates a multimedia content distribution system 100, according to an embodiment of the present disclosure. The system 100 may receive information pertaining to previously distributed multimedia content items and multimedia content items to be distributed from data sources 101. For example, the data sources 101 may include data sources 101a-d providing content release data, screen availability data, viewership data, and occupancy data. These and other types of data provided by the data sources 101 are further described below. The data sources 101 may also include content providers providing information about their multimedia content items.

Depending on the system capabilities of the data sources 101, the size of the data received from each data source may vary. Also, the format of the data received from each data source may vary, and may be provided in a structured or unstructured format. A data set processing subsystem 102 may receive the data from the data sources 101 and transform and load the data into a database in a content analytics subsystem 103. For example, the data set processing subsystem 102 may perform extract, transform and load (ETL) operations. The ETL operations may include extracting or receiving data pushed to the system 100 from the data sources 101. The ETL operations may include converting received data from their previous form into a form they need to be in so that they can be placed into a target database at the content analytics subsystem 103. Transformation operations may be performed using rules and intermediary tables, and may include combining data with other data. Load operations may include writing the transformed data into the target database.

The content analytics subsystem 103 can execute analytics to predict viewership, theatre occupancy, and collections for a multimedia content item, and to determine a release date for the multimedia content item that may maximize one or more of the viewership, theatre occupancy, and collections for the multimedia content item. Occupancy may include the percentage of seats occupied for a viewing screen per showing. For example, if a viewing screen has 300 seats, 100% capacity means that tickets were sold for every one of the 300 seats for a single movie showing on the viewing screen. Occupancy may be described as the number of seats sold per showing or the percentage of full capacity occupied per showing. Viewership may be the number of views of a multimedia content item. For example, a movie may be distributed to an end user device or customer premises and viewed on a television or the end user device. Metrics may be captured determining the number of views and/or monetary collections for each viewing. Collections may include sales, such as box office ticket sales, subscriber revenue, on-demand sales, etc. Occupancy, viewership and/or collections may be predicted by the content analytics subsystem 103. The content analytics subsystem 103 may also determine a subset of viewing screens that are provided in different geographic locations, and a subset of customer premises and end users for distributing the multimedia content item that may maximize one or more of the viewership, theatre occupancy, and collections for the multimedia content item.

The content analytics subsystem 103 may include one or more computers to perform its operations. In an example, the content analytics subsystem 103 may include servers, such as analytics server 103a, database server 103b, and front end server 103c. The analytics server 103a may execute analytic applications to predict viewership, theatre occupancy, and collections, and to determine release dates and destinations, such as viewing screens, customer premises and end users, for multimedia content items.

The database server 103b may store data from the data sources 101 and may be used by the analytics server 103a and the front end server 103c for their respective operations. The front end server 103c may generate a graphical user interface, such as dashboard 131, for users 130 to view the information and predictions determined by the analytics server 103a, and may include a web server. The users 130 may also perform what-if analysis via the dashboard 131, such as by modifying various criteria used by the analytics server 103a to determine its prediction and other information described herein.

Computers used for the system 100 may include architecture 190 which may include one or more processors 194 and hardware data storage 195. The data storage 195 may include a non-transitory storage medium to store machine readable instructions that are executable by the processors 194 to perform the operations of the system 100. For example, the machine readable instructions may include software for dashboard generator 191, analytics engine 192 and database 103. The dashboard generator 191 may generate the dashboard 131. The analytics engine 192 executes analytics applications for the content analytics subsystem 103 to make its predictions, and the database 193 may store the data from the data sources 101 and other information used by the subsystem 103.

Content distribution subsystem 104 controls distribution of multimedia content items from content providers 132. Timing and destinations for the distribution of the multimedia content items may be based on release dates and destinations determined for the multimedia content items by the content analytics subsystem 103. A content storage 111 may store the multimedia content items to be delivered. A content delivery scheduler 112 may control delivery of the multimedia content items according to release dates and destinations determined by the content analytics subsystem 103.

Content delivery resources 113 send the multimedia content items to their destinations via content distribution network 121. The content distribution network 121 may include high-speed networks provided by one or more service providers. The content distribution network 121 may include a fiber optic network, a satellite network, and/or other types of networks. The content delivery resources 113 may include encoders that encode multimedia content items for transmission on the content distribution network 121, and may include network interfaces. The encoding may include video compression, such as MPEG compression or another form of compression. In an example, a multimedia content item is a movie, and the movie is encoded and transmitted to its destinations. The destinations may include theatres 120 which include viewing screens 122 for showing the movie. The delivery resources 113 may send the encoded movie to theatre servers 123, which store the movie and meta data about the movie such as content item identifier, time, date, location, etc. The theatre servers 123 may report via the content distribution network 121 the meta data and information about when the movie was played on the viewing screens 122 to the content distribution subsystem 104. The content distribution subsystem 104 may upload this information into a central database for safe keeping, reporting, and analysis. Other destinations may include customer premises 130 and end users 140. Customer premises 130 may include homes, businesses, etc. A customer premises may include a set top box to receive a multimedia content item from the content distribution system 104, and decode and play the multimedia content item. End users 140 may have end user devices, such as smart phones, laptops, tablets, etc., that can receive a multimedia content item from the content distribution system 104, and decode and play the multimedia content item.

As discussed above, the content analytics subsystem 103 can execute analytics to predict viewership, theatre occupancy, and collections for a multimedia content item. The content analytics subsystem 103 may also use the analytics to determine a target release date for the multimedia content item that may maximize one or more of the viewership, theatre occupancy, and collections for the multimedia content item. The analytics are further described below, by way of example, with respect to determining a target release date for a multimedia content item comprising a movie, and determining a subset of available viewing screens in theatres for showing the movie based on the analytics. The system 100, however, may execute the analytics to determine a target release date for a multimedia content item other than a movie, and to determine a subset of destinations for playing the multimedia content item, whereby the destination may include one or more of available viewing screens in theatres 120, customer premises 130, and users 140. The example is described with respect to a data flow diagram shown in FIG. 2 and a process shown in FIG. 3.

Figure 2:
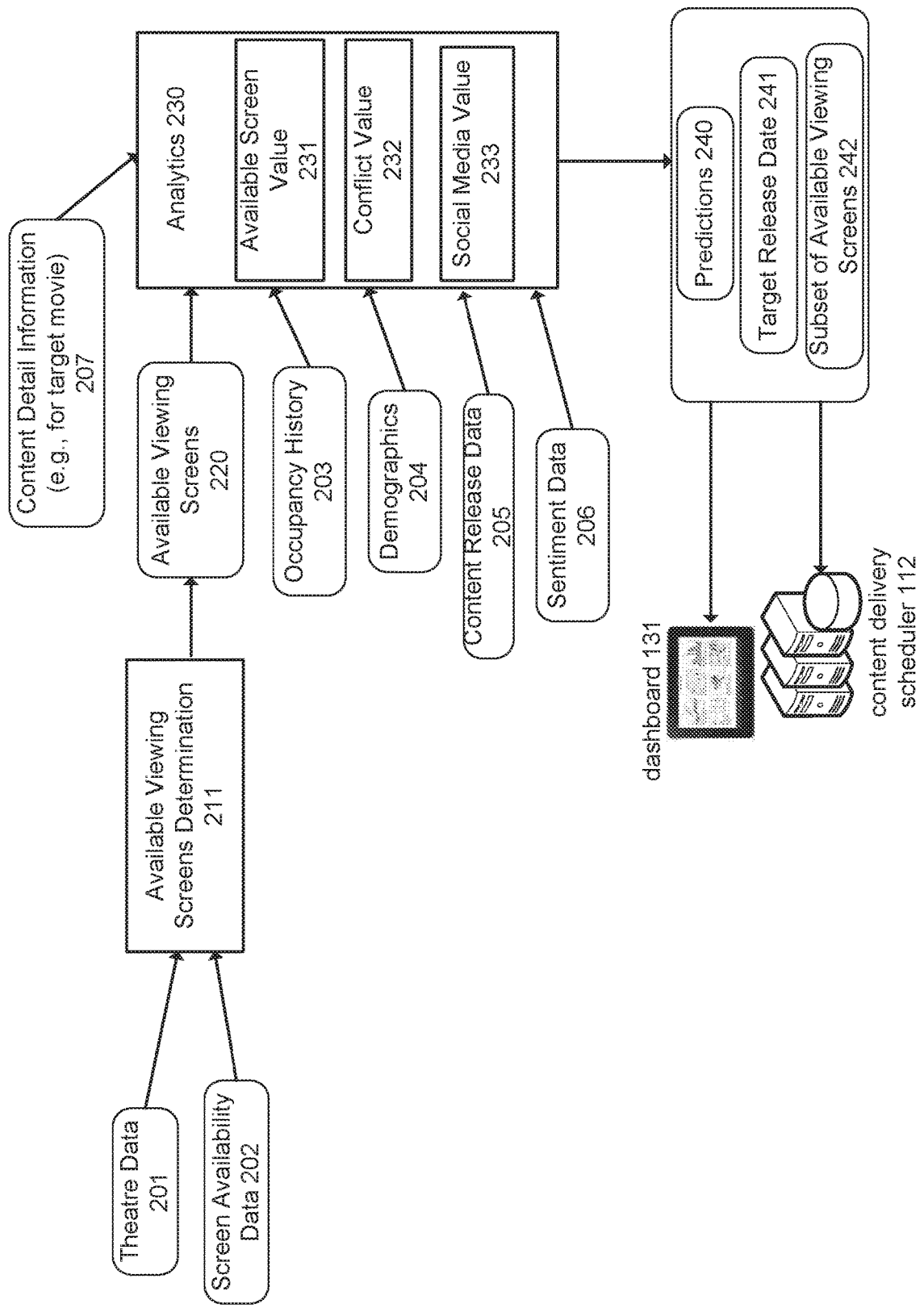
FIG. 2 illustrates a data flow diagram, according to an embodiment.

Referring to FIG. 2, the data from the data sources 101 may include theatre data 201 and screen availability data 201. The theatre data 201 describes information pertaining to the theatres 120 and viewing screens 122 of the theatres 120. The theatre data 201 may include geographic locations of the theatres 120, number of viewing screens 122 of each theatre, types of viewing screens, number of seats, etc. The screen availability data 202 describes the availability of the viewing screens for each theatre. For example, theatre owners may enter into agreements with movie distributors or studios to show a movie on a number of viewing screens for a period of time in the future, i.e., the movie release window. The target release date is the first day the movie is shown, such as the first day of the movie release window. Accordingly, a number of viewing screens in a theatre may be reserved and unavailable for showing other movies. National Association of Theatre Owners (NATO) and/or other data sources, which may be part of the screen availability data source 101b shown in FIG. 1, may provide the screen availability data 202, including information pertaining to availability of viewing screens 122 for the theatres 120, and may provide the theatre data 201. The content analytics subsystem 103 may determine available viewing screens 211 from the theatre data 201 and the screen availability data 202. In an example, a six month period of time (or a period of time of another length) is selected by a user. The number of available screens may be determined for a micro period, such as each day, of the six month period of time. To determine the number of available screens, the total number of viewing screens 122 is determined for each theatre, for example, from the theatre data 201. The reserved or blocked viewing screens of the viewing screens 122 may be determined from the screen availability data 202, which may be provided for each day. The number of available screens may be determined, for each day, by subtracting the total number of viewing screens for each theatre from the number of reserved viewing screens for each theatre, for each day. Also, information associated with the number of available viewing screens, such as the type of viewing screens, e.g., three-dimensional, IMAX, etc., and number of seats for each available viewing screen may be determined. This information may be stored and displayed in the dashboard 131.

Analytics 230 executed by the content analytics subsystem 103 can determine predictions 240 for a multimedia content item to be released, a target release date 241 and a subset of available viewing screens 242 and/or destinations (which may include a subset of the available viewing screens 220, the customer premises 130 and the users 140 for delivering the multimedia content item thereto and playing the multimedia content item) that maximizes occupancy, viewings, collections or another metric for the multimedia content item. For example, assume a movie studio is trying to determine a future target release date for a movie that it will be releasing, referred to as the target movie. The movie studio may want to determine a target release date that maximizes theatre occupancy and viewings for the target movie. A variety of factors and data are determined for making the predictions 240. For example, the content analytics subsystem 103 may determine one or more of content detail information 207, such as genre, cast, production cost to make the movie, etc., for the target movie, the available viewing screens 220 for potential target release dates, occupancy history 203 of theatres 120, demographics 204 of people viewing movies, and content release data 205, which may include a schedule of other movies being released during the potential target release dates of the target movie which may conflict with the release of the target movie. From this data, values are determined for calculating the predictions 240, such as an available screen value 231, a conflict value 232, and a social media value 233.

For example, the available screen value 231 may be determined for each of the available viewing screens for potential target release dates. The available screen value 231 for an available viewing screen may be based on the type of viewing screen, prior occupancy for the available viewing screen, price sold for tickets for the available viewing screen, and the content detail information 207 for the target movie. For example, an available viewing screen may be IMAX, which is a large format film that is shown on larger screens. Certain genres of films may have greater occupancy for IMAX, such as science fiction or block buster action movies, which may be based on historical occupancy information (e.g., occupancy history 203). An available IMAX viewing screen may be given a higher screen value for a science fiction or block buster action movie than other genres of movies that may be played on the available IMAX viewing screen.

The conflict value 232 describes the impact that other movies may have on the occupancy for the target movie for a potential target release date for the target movie. For example, the data sources 101 may include content release data source 101a that provides content release data 206. The content release data 206 includes release dates for movies other than the target movies, and may also include information about the other movies, such as title, genre, cast, production costs, studio name, etc. A data source called the numbers (www.the-numbers.com) is an example of a data source that may provide a release schedule for other movies. Other movies released on the same day or weekend as the potential target release date for the target movie, or released a week before or after the target movie may have an impact on the occupancy for the target movie for the target release date. If a blockbuster movie is being released on the same weekend or a week before or a week after the target movie, the occupancy and collections for the target movie may be reduced. Also, if a movie of a similar genre is being released at the same or similar release date of the target movie, the occupancy and collections for the target movie may be reduced. This type of information is used to determine the conflict value 232.

The social media value 233 may be determined from sentiment data 206 collected from social media applications. For example, marketing campaigns for the target movie may include marketing through social media applications, such as Facebook® and Twitter®. Sentiment data describing positive, negative or neutral comments about the target movie may be captured from the social media applications and used to determine the social media value 233, such as positive, negative or neutral sentiment.

In an example, values 231-233 may be weights that are used to modify a predicted value for the target movie. For example, an initial occupancy prediction is made for a potential target release date of the target movie. The initial occupancy prediction may be based on the occupancy history 203 for the available viewing screens 220 based on demographics of the viewers (e.g., movie goers) of the available screens and previous occupancy for movies of the same or similar genre, cast, production cost, etc. The initial occupancy prediction may be modified by multiplying it by weights, such as the values 231-233, to determine the occupancy prediction for the target movie for a subset of the available viewing screens 220.

As is further discussed below, the occupancy prediction, which may be part of the predictions 240, may be determined for multiple potential target release dates, and for subsets of the available viewing screens 220. The analytics 230 may also determine from this information the target release date 241 and the subsets of the available viewing screen 242 that maximize occupancy or collections or another predicted metric for the target movie. This information may be provided to the dashboard 131. A user may modify one or parameters to perform what-if analysis for the predictions. Also, the target release date 241 and the subsets of the available viewing screens 242 may be provided to the content delivery scheduler 112 of the content distribution subsystem 104 shown in FIG. 1. The content delivery scheduler 112 may schedule delivery to the theatre servers 123 of the theatres 122 having the subsets of the available viewing screens 242 on or prior to the target release date 241 for showings on the available viewing screens 242. Also, the target movie may be distributed to a subset of the customer premises 130 and the end users 140 to maximize viewings and collections for the target movie.

Figure 3:
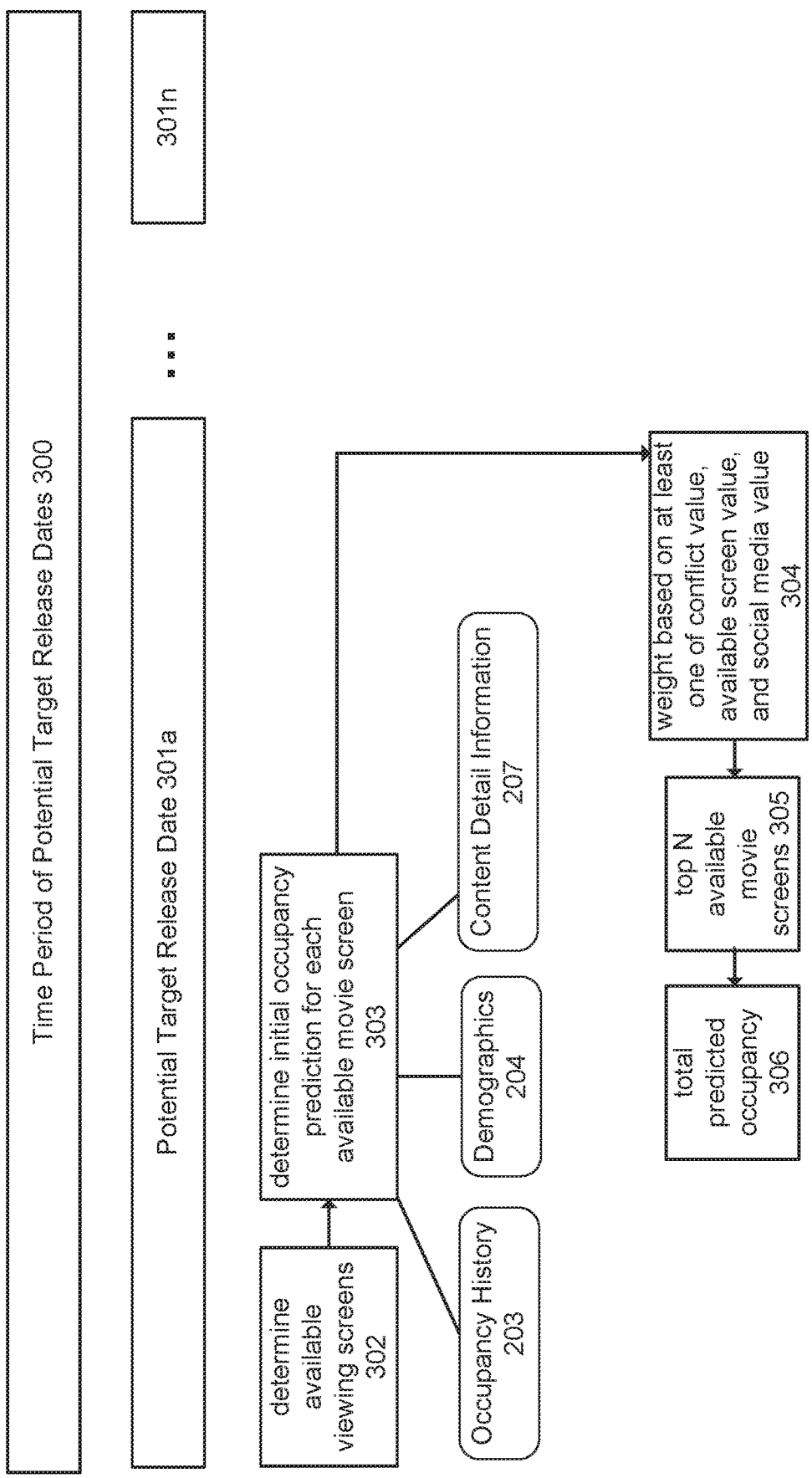
FIG. 3 illustrates a method, according to an embodiment.

FIG. 3 describes a further example of determining the predictions 240, the target release date 241 for the target movie, and the subset of available viewing screens 242 for showing the target movie. The content analytics subsystem 103 may receive from one of the users 130, via the dashboard 130, a time period for determining a release date for the target movie therein. For example, the user may send a request to identify an optimum target release date that falls within a six month time period in the future. This time period is shown in FIG. 3 as time period of potential target release dates 300. A set of potential target release dates 301a-n within the time period is determined, such as every Friday and Saturday within the time period 300. For each potential target release date 301a-n, predictions, a target release date for the target movie, and a subset of available viewing screens for showing the target movie are determined. For example, potential target release date 301a represents an earliest potential target release dates in the time period 300 for which the predictions, target release date, and subset of available viewing screens are determined, but the predictions, target release date, and subset of available viewing screens may be determined for each potential target release date 301a-n according to the process shown under the potential target release date 301a, and one of the potential target release dates 301a-n may be selected as the target release date 241 that maximizes occupancy. The process may be performed by a computer of the content analytics subsystem 103.

At 302, the available viewing screens are determined for the potential target release date 301a. To determine the number of available screens, the total number of viewing screens are determined for the theatres 120, for example, from the theatre data 201, and the reserved or blocked viewing screens of the theatres 120 may be determined from the screen availability data 202, which may include a schedule of movie releases. The number of available screens may be determined for the potential target release date 301a by subtracting the total number of viewing screens for each theatre from the number of reserved viewing screens for the potential target release date 301a.

At 303, an initial occupancy prediction is determined for each of the available viewing screens determined at 302. The occupancy history 203, demographics 204 of viewers and content detail information 207 may be used to determine the initial occupancy prediction for each available movie screen. For example, modeling may be used to determine the initial occupancy prediction for an available viewing screen. The occupancy history for the available viewing screen may be determined for movies previously shown on the viewing screen, such as percentage of full capacity for each showing. Also, content detail information for the previously shown movies are determined, such as cast, genre, product costs, etc. The same information is determined for the target movie, such as from the content detail information 207 for the target movie, to identify previously shown movies that are similar to the target movie in terms of one or more attributes, such as cast, genre, production costs, seasonality, etc. The initial occupancy prediction may be determined for the target movie from the occupancy history for the similar previously shown movies. Also, the initial occupancy prediction may be determined for a release window, which is the period of time the movie will be played on the available movie screens starting from the target release date.

Also, at 303, demographics 204 of the movie goers for the available movie theatre may be used to predict the occupancy at 303.

For example, online movie ticket purchases may capture user profile information for purchases, which may include demographics, such as gender, age, ethnicity, socio-economic status, geographic region, etc. Also, census information may be used to estimate the demographics for a geographic region where the available movie screen is located.

The modeling may include segmentation which divides users, such as movie goers, into groups of individuals that are determined to be similar based on variables. The variables may be variables for demographics, such as age, gender, ethnicity, socio-economic status, geographic region, etc., and variables for movies, such as genre of movies most watched, casts most watched, amount spent on movie tickets, etc. Clustering, such as k-means clustering or another clustering function, may be used to identify groups of individuals that have a common interest, such as teens and young adults have the highest occupancy for horror or action movies, or children and mothers have the highest occupancy for animated movies, etc. Accordingly, from the modeling, it may be determined that certain demographics of movie goers are more apt to purchase movie tickets. If the demographics of the movie goers for the available viewing screen match the demographics of movie goers that are more apt to purchase movie tickets for the target movie, then the predicted occupancy may be increased.

At 304, the initial occupancy prediction determined for each available viewing screen, determined at 303, is weighted. For example, one or more of conflict value 232, available screen value 231, and social media value 233 are determined, and may be used as weights for weighting the initial occupancy prediction. The weights may be multiplied by the initial occupancy prediction to weight the initial occupancy prediction.

The conflict value 232 may be determined based on overlapping release dates of other movies (e.g., competing movies). For example, the conflict value 232 may be determined by identifying other movies that have a target release date within a predetermined period of time of the potential target release date 301a of the target movie. In an example, the predetermined period of time may extend from one week prior to the potential target release date 301a to one week after the potential target release date 301a. However, for some movies, such as blockbusters, the predetermined period of time may be longer. A blockbuster may be defined as a movie that is estimated to have ticket sales above a predetermined threshold.

The conflict value 232 may be determined based on the multiple factors, such as overlapping release dates of competing movies, affinity of the viewers towards the target movie and the affinity of the viewers towards the competing movies. The conflict value 232 may adversely impact the target movie occupancy. For example, the affinity towards the target movie is impacted by a similar affinity of the viewers towards the other competitor movie releasing on or near the target movie release date. So the more affinity the viewers have towards the competitor movie, the more the conflict value 232 causes the predicted occupancy of the target movie to be reduced. Also, the following are some of the factors that may be considered while calculating the conflict value 232 for the target movie and a competing movie: are both the movies are of same genre; are both movies eagerly awaited (e.g., are both movies predicted to be blockbusters); are both movies promoted the same way, such as through the same marketing channels; etc. By way of example, if factors for determining the conflict value 232 for the target movie include that a competing movie of the same genre is being released within the predetermined time period and that another blockbuster movie is being released within the predetermined period of time, a conflict value is determined that will reduce the initial occupancy prediction for the target movie when multiplied by the initial occupancy prediction. The conflict value 232 may be the same for each of the available viewing screens.

The available screen value 231 may be determined for each available viewing screen and may be associated with screen type or class, screen affinity and/or ticket price appreciation for the available viewing screen. Screen affinity may include the affinity of the viewers to watch any kind of movie on a the viewing screen. Factors for determining screen affinity may include geographic location of the viewing screen, historical demographics of viewers of the viewing screen, grade or class or type of the viewing screen, and genre of movie to be released on the viewing screen. The ticket price appreciation may depend on the historic data of how a similar movie's tickets are sold. This historic data can be collected from data sources providing data from online ticket sales, such as data about occupancy, ticket sales and ticket prices for each particular viewing screen. Ticket price appreciation may also depend on the release timelines of the movie on the particular viewing screen. Ticket price appreciation may be predicted according to the historical data of similar movies that are released in similar timelines. In an example, the available screen value 231 may be calculated based on screen affinity and occupancy data of that particular viewing screen.

The social media value 233 may be determined from sentiment data 206 collected from social media applications. The social media value 233 may be the same for all the available viewing screens or may be different based on geographic location, demographics, etc.

In an example, the weights for the values 231-233 may be High, Medium or Low. For example, if the impact of movies being released close to the potential target release date 301*a* is estimated to be large, the conflict value 232 may be set to a predetermined Low weighting of 0.3 to reduce the initial occupancy prediction for the target movie when multiplied by the weight. A Medium weighting may be equal to 1 (e.g., neutral impact), and a high weighting may be equal to 1.3 if there are no movies that are estimated to impact the occupancy of the target movie on the potential target release date 301*a*. For the sentiment value 233 weighting, a neutral sentiment may be equal to 1; a positive sentiment may be equal to 1.3, and a negative sentiment may be equal to 0.3. For the available screen value 231 weighting, a high screen affinity may be equal to 1.3; a neutral screen affinity may be equal to 1; and a negative screen affinity may be equal to 3.

The output of step 304 is a weighted occupancy prediction for each available viewing screen for the potential target release date 301*a*. At 305, the available viewing screens having the top N weighted occupancy predictions, where N is an integer greater than 1, are determined. In an example, a movie studio may have to pay a movie theatre owner to show the target movie on the available viewing screen. Due to budgetary constraints, the movie studio cannot release the movie on all the available movie screens. Therefore, the available viewing screens having the top N weighted occupancy predictions may be selected for release of the target movie. At 306, a total predicted occupancy may be determined for the potential target release date 301*a* by summing the top N weighted occupancy predictions.

The total predicted occupancy may be determined for each of the potential target release dates 301*a-n*, and the potential target release date having the highest total predicted occupancy may be selected as the target release date 241 shown in FIG. 2. Also, the available viewing screens for the potential target release date having the highest total predicted occupancy is the subset of available viewing screens 242 shown in FIG. 2.

Figure 4:
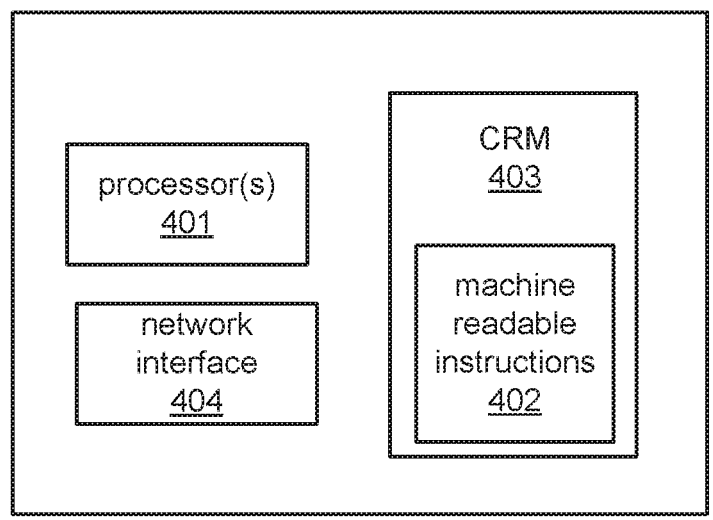
FIG. 4 illustrates hardware for the multimedia content distribution system, according to an embodiment.

FIG. 4 illustrates an example of a computing hardware configuration for the system 100. The computing hardware may be used in a computer in any of the subsystems of the system 100. Although not shown additional hardware components may be used for the system 100. One or more processors 401 may execute machine readable instructions 402 stored in a non-transitory computer readable medium 403 to perform the operations of system 100, including the operations of subsystems and the methods and other operations described herein. The non-transitory computer readable medium 403 may include memory, a hard drive or another type of data storage. Network interface 404 may connect to a network to send data to a destination or receive data from another computer connected to the network.

Embodiments and examples are described above, and those skilled in the art will be able to make various modifications to the described embodiments and examples without departing from the scope of the embodiments and examples.

What is claimed is:

1. A multimedia content distribution system comprising:
a content analytics subsystem comprising:
a database server to store data from a plurality of sources, the data including content release data identifying content release dates of a plurality of multimedia content items for a period of time, screen availability data identifying screen availability of a plurality of viewing screens located in different geographic locations, occupancy data, and demographics data;
an analytics server, including at least one processor, to:
determine, from the plurality of viewing screens, available viewing screens for at least one micro period within the period of time based on the screen availability data, wherein the at least one micro period comprises a plurality of target release dates for a new multimedia content item;
determine occupancy history of the available viewing screens based on the occupancy data;
determine demographics of the occupancy history based on the demographics data;
receive content detail information for the new multimedia content item to be released during the period of time;
determine, for each of the plurality of target release dates in the at least one micro period, a prediction of occupancy for each of the available viewing screens for the new multimedia content item to be released during the at least one micro period according to the content release data, the occupancy history, the demographics of the occupancy history, and the content detail information;
select a subset of the available viewing screens having a highest predicted occupancy; and
select one of the plurality of target release dates having a highest prediction of occupancy; and
a content distribution subsystem analytics subsystem comprising:
a content data storage to store the plurality of multimedia content items and the new multimedia content item;
a content delivery scheduler including machine readable instructions executable by at least one processor of a computer of the content distribution subsystem to schedule delivery of the new multimedia content item to destinations associated with the subset of the available viewing screens on or prior to the selected one of the plurality of target release dates; and content delivery resources to send the new multimedia content item to the destinations via a content distribution network.

2. The multimedia content distribution system of claim 1, wherein the analytics server is to:
calculate a conflict value for the available viewing screens based on the content release data for the at least one micro period and the content detail information; and
determine the prediction of occupancy for each of the available viewing screens based on the conflict value.

3. The multimedia content distribution system of claim 1, wherein the analytics server is to:
receive social media data regarding sentiment for the new multimedia content item to be released; and
determine the prediction of occupancy for each of the available viewing screens based on the sentiment.

4. The multimedia content distribution system of claim 1, wherein the analytics server is to:
calculate an available viewing screen value for the available viewing screens based on screen affinity; and
determine the prediction of occupancy for each of the available viewing screens based on the available viewing screen value.

5. The multimedia content distribution system of claim 1, wherein the content analytics subsystem comprises:
a front end server to generate a dashboard comprised of a graphical user interface, wherein the dashboard displays information associated with the at least one micro period and the subset of the available viewing screens having the highest predicted occupancy, and transmits the dashboard over a network to an end user device to display the dashboard on the end user device.

6. The multimedia content distribution system of claim 1, wherein the destinations comprise at least one of movie theatre servers, customer premises equipment and end user devices.

7. The multimedia content distribution system of claim 1, wherein the prediction of occupancy comprises at least one of predicting percentage of full capacity for the available viewing screens, predicting number of viewers, and predicting collections.

8. A content analytics system comprising:
a database server to store data from a plurality of sources, the data including content release data identifying content release dates of a plurality of multimedia content items for a period of time, screen availability data identifying screen availability of a plurality of viewing screens located in different geographic locations, occupancy data, and demographics data; and
at least one processor executing machine readable instructions to:
determine, from the plurality of viewing screens, available viewing screens for at least one micro period within the period of time based on the screen availability data;
determine occupancy history of the available viewing screens based on the occupancy data;
determine demographics of the occupancy history based on the demographics data;
receive content detail information for a new multimedia content item to be released during the period of time;
determine, for the at least one micro period, a prediction of occupancy for each of the available viewing screens for the new multimedia content item to be released during the at least one micro period according to the content release data, the occupancy history, the demographics of the occupancy history, and the content detail information;
select a subset of the available viewing screens having a highest predicted occupancy; and
generate a dashboard comprised of a graphical user interface, wherein the dashboard displays information associated with the at least one micro period and the selected subset of available viewing screens having the highest predicted occupancy, and transmits the dashboard over a network to an end user device to display the dashboard on the end user device.

9. The content analytics system of claim 8, wherein the new multimedia content item is scheduled for transmission to destinations associated with the selected subset of available viewing screens over a computer network.

10. The content analytics system of claim 9, wherein the new multimedia content item comprises video, and the computer network comprises a video distribution network.

11. The content analytics system of claim 8, wherein the at least one micro period comprises a plurality of target release dates for the new multimedia content item, and the at least one processor is to:
determine, for each of the target release dates, the prediction of occupancy for each of the available viewing screens; and
select one of the target release dates having a highest prediction of occupancy.

12. The content analytics system of claim 8, wherein the at least one processor is to:
calculate a conflict value for the available viewing screens based on the content release data for the at least one micro period and the content detail information; and
determine the prediction of occupancy for each of the available viewing screens based on the conflict value.

13. The content analytics system of claim 8, wherein the at least one processor is to:
receive social media data regarding sentiment for the new multimedia content item to be released; and
determine the prediction of occupancy for each of the available viewing screens based on the sentiment.

14. The content analytics system of claim 8, wherein the at least one processor is to:
calculate an available viewing screen value for the available viewing screens based on screen affinity; and
determine the prediction of occupancy for each of the available viewing screens based on the available viewing screen value.

15. A computer-implemented method comprising:
receiving, from a plurality of data sources, content release data identifying content release dates of a plurality of multimedia content items for a period of time, screen availability data identifying screen availability of a plurality of viewing screens located in different geographic locations, occupancy data, and demographics data;
determining, from the plurality of viewing screens, available viewing screens for a plurality of potential target release dates within the period of time based on the screen availability data;
determining, for each of the plurality of potential target release dates, occupancy history of the available viewing screens based on the occupancy data;
determining demographics for the occupancy history based on the demographics data;
receive content detail information for a new multimedia content item to be released during the period of time;

determining, for each of the plurality of potential target release dates, a prediction of occupancy for each of the available viewing screens for the new multimedia content item according to the content release data, the occupancy history, the demographics of the occupancy history, and the content detail information;

selecting, for each of the plurality of potential target release dates, a subset of the available viewing screens having a highest predicted occupancy; and generating a dashboard comprised of a graphical user interface, wherein the dashboard displays information associated with the plurality of potential target release dates and the corresponding selected subset of the available viewing screens having the highest predicted occupancy, and transmitting the dashboard over a network to an end user device to display the dashboard on the end user device.

16. The computer implemented method of claim 15, comprising:

selecting one of the potential target release dates having a highest total predicted occupancy for releasing the new multimedia content item.

17. The computer implemented method of claim 15, comprising:

calculating a conflict value for the available viewing screens based on the content release data and the content detail information; and determining the prediction of occupancy for each of the available viewing screens based on the conflict value.

18. The computer implemented method of claim 15, comprising:

receiving social media data regarding sentiment for the multimedia content item to be released; and determining the prediction of occupancy for each of the available viewing screens based on the sentiment.

19. The computer implemented method of claim 15, comprising:

calculating an available viewing screen value for the available viewing screens based on screen affinity; and determining the prediction of occupancy for each of the available viewing screens based on the available viewing screen value.

20. The multimedia content distribution system of claim 1, wherein the analytics server is further to:

calculate an available viewing screen value for the available viewing screens;

calculate schedule conflict value based on an impact of occupancy that other multimedia content items;

calculate a social media marketing value based on sentiment data for the new multimedia content item; and modify the prediction of occupancy for each of the available viewing screens according to a first weight value associated with the available viewing screen value, a second weight value associated with the schedule conflict value, and a third weight value associated with the social media marketing value.

* * * * *